H. N. RANDALL.
LAND MARKER.
APPLICATION FILED SEPT. 30, 1907.

913,235.

Patented Feb. 23, 1909.
3 SHEETS—SHEET 1.

Witnesses

Inventor
Horace N. Randall

UNITED STATES PATENT OFFICE.

HORACE N. RANDALL, OF MINNEAPOLIS, MINNESOTA.

LAND-MARKER.

No. 913,235.　　　　Specification of Letters Patent.　　　Patented Feb. 23, 1909.

Application filed September 30, 1907. Serial No. 395,190.

*To all whom it may concern:*

Be it known that I, HORACE N. RANDALL, a citizen of the United States, and a resident of Minneapolis, county of Hennepin, State of Minnesota, have invented certain new and useful Improvements in Land-Markers, of which the following is a full, clear, and concise specification.

My invention relates to land markers to be used for agricultural purposes, the object of my invention being to provide a marker which will form a series of parallel, V shaped furrows across a field to facilitate the operation of planting or transplanting in uniformly spaced courses.

An additional object of my invention is to provide means for indicating the relative transverse positions of the deposited hills.

This invention is adapted for use in connection with various forms of planters, transplanters and the like, but is particularly designed for use in connection with the mechanism set forth in my application for patent for corn planters, Serial Number 380,827, filed June 25, 1907, the combination of which sets forth unusual advantages for planting corn.

In attaining the object of my invention, I provide a revolving spider rigidly secured upon a shaft, said spider being provided with suitably spaced marking balls, and said shaft being detachably secured to the driving shaft by an equi-angular gudgeon, the several faces of which bear homologous angular positions to the respective marking balls, whereby the gudgeon may be inserted at any position without varying the time relation between the spider and planting mechanism.

A distinct advantage is gained by the use of individual horse guide markers, whereby a furrow or mark is provided for each horse to follow, thus utilizing an instinct prevalent with horses.

The invention aims to accomplish the foregoing results by means of a simple construction comprising few and durable parts, which may be manufactured and assembled at a comparatively small cost, which will operate with a high standard of efficiency, and which may be conveniently manipulated by the operator.

To enable those skilled in the art to which this device appertains, to more fully comprehend the method of operation and the merits thereof, a specific embodiment of my invention is clearly set forth in the following specification, the details of construction of which are fully illustrated in the accompanying drawings, the actual scope of my invention being more particularly pointed out in the subjoined claims.

Figure 4:
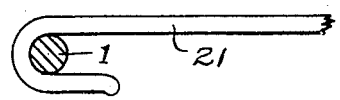
Figure 2:
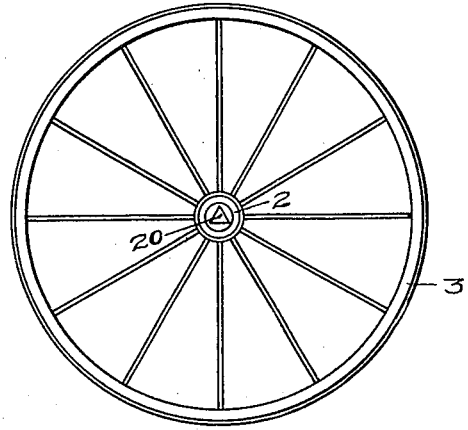
Figure 3:
Figure 1:
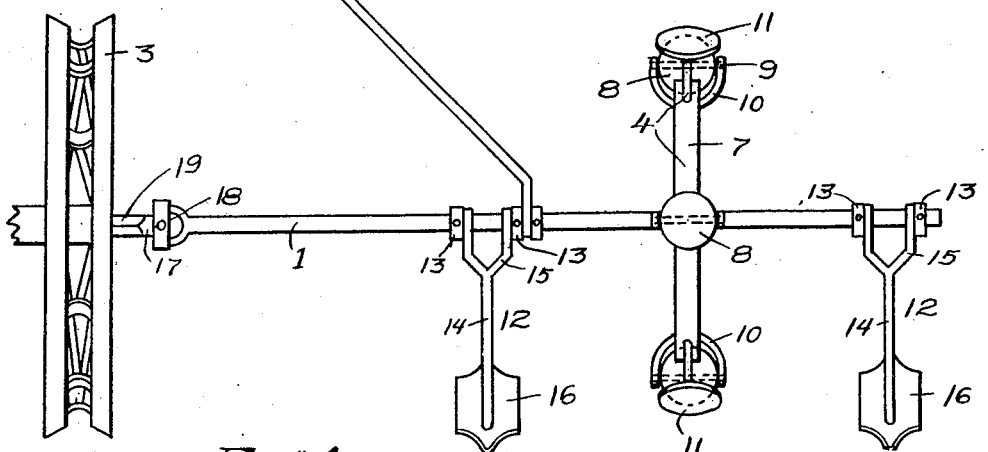
Figure 5:
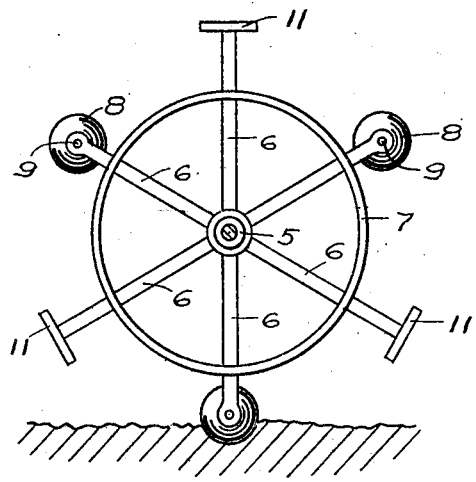
Figure 7:
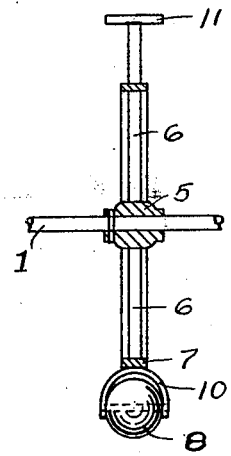
Figure 6:
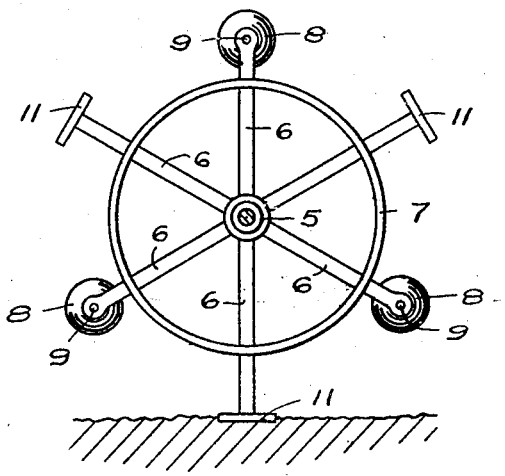
Figure 9:
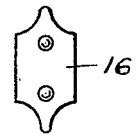
Figure 8:
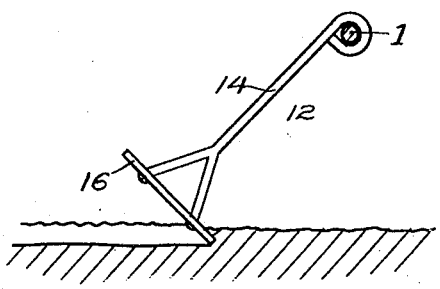
Figure 10:
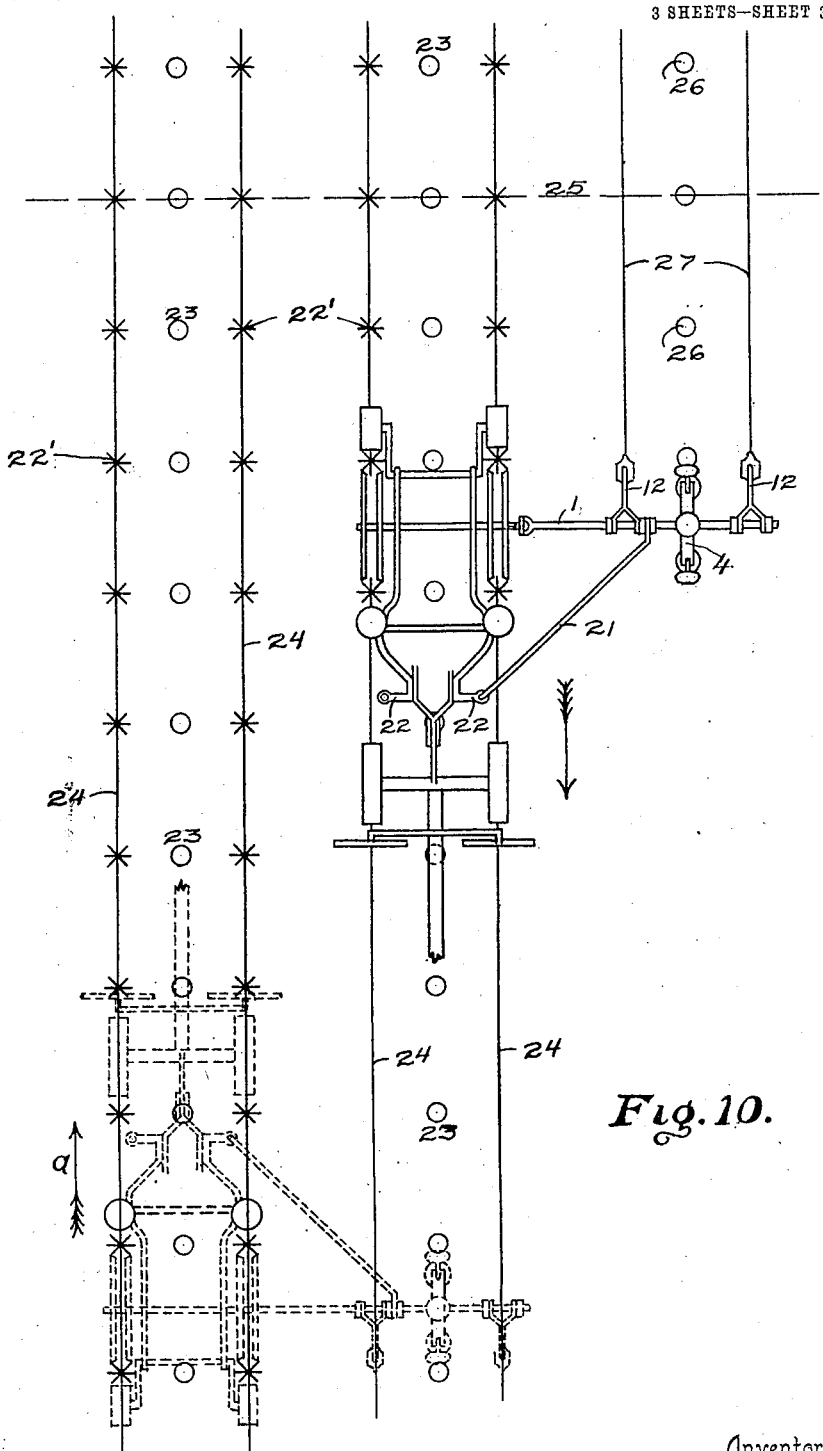

In the drawings: Figure 1 is a plan view of the marker showing the method of attachment to an implement. Fig. 2 is a detail of a planter wheel provided with an equi-angular socket to receive the gudgeon. Fig. 3 is a cross-sectional view of the gudgeon. Fig. 4 is a detail showing guyrod detachably secured upon marker shaft. Figs. 5, and 6 are side views of spacer showing relative indentations of marking balls and step plates. Fig. 7 is a sectional view of spacer. Fig. 8 is a detail showing operation of horse guide marker. Fig. 9 is a detail of a marker blade. And Fig. 10 is a plan of a field showing positions of spacer marks and the planted hills, also showing the relative positions of a machine when making marks and when following previous marks.

Referring to the drawings in detail, similar numerals of reference indicate like parts throughout the specification and in the several views of the drawings.

The driving shaft 1 is detachably secured to the hub 2, of the traction wheel 3, of the implement with which my device is being used, said driving shaft extending in approximate alinement with the axis of said traction wheel. Near the outer end of said driving shaft is rigidly secured a marking wheel, of which the hub 5 is provided with radial arms 6, which are securely braced by the circular truss 7, thereby forming a suitable skeleton spider which is very light and stiff.

The marking balls 8 are rotatively mounted upon the pins 9, in the yokes 10, which are formed at the terminals of alternate radial arms 6. The remaining arms 6 are provided with intermediate step plates 11, adapted to facilitate the rotation of said spider over the ground, leaving flat, shallow prints which are readily discernible from the deep, cup like depressions formed by the marking balls, reference being had to Figs. 5 and 6 of the drawings in which the comparative depths and shapes of the prints and depressions are clearly set forth.

The individual horse guide markers 12, are pivotally secured upon the shaft 1, said marker being secured from longitudinal movements upon said shaft by means of the fixed collars 13. The arm 14 terminates in form of a yoke 15 at its upper end, thereby bracing said marker from undesirable lateral movements and causing same to operate with greater accuracy. A double pointed marking shoe 16 is rigidly secured in a transverse position at the lower end of said arm 14, and suitably braced to resist tensile strains. Said marking shoe is adapted to operate best at an angular position, substantially as shown in Fig. 8 of the drawings, wherein it has a tendency to pierce the ground to a suitable depth leaving a very perceptible V shaped furrow which may be easily distinguished by the operator and the horses.

The shaft 1 is flexibly connected to a gudgeon 17, by means of a universal joint 18. The gudgeon 17 terminates in an equi-angular shank 19 adapted to snugly fit in an equi-angular socket 20, which is provided in the hub 2, of each traction wheel 3. Said gudgeon may be easily inserted or removed from its socket, and while in operation, the inward tendency of the marking wheel prevents accidental displacement of same.

In the present construction a three ball marker is employed, as this is found to be the most convenient size, consequently the gudgeon is provided with three sides to correspond with the number of balls of the marker. As the balls of the marker are equi-distant and the gudgeon is equi-angular, any position at which the gudgeon may be inserted in the socket, will cause said marking balls to maintain the same time with the drive wheels. The universal joint 18 adapts the marking wheel to follow the undulations of the ground independent of the planter to which it is attached. The longitudinal position of the spider 4 is such that the marks or depressions made by the balls 8 will indicate the position of the center of the machine upon its return trip. The horse guide markers 12 are equally spaced upon each side of the spider and indicate the position of the two rows which will be planted upon the return trip. The positions of these marks are such that each horse will have one mark to follow and it has been demonstrated that the average horse will follow his mark more accurately than the driver can drive a team over a single, central mark.

At an intermediate point on shaft 1 is pivotally secured a guyrod 21, which is adapted to engage a bracket 22, which is provided upon either side at the forward portion of the planter. This guyrod is adapted to hold the driving shaft 1 at an angle of 90° with the direction of machine travel, and is preferably formed so that it may be easily detached from both machine and driving shaft, for convenience in transposing from one side to the other when turning the machine for a return trip.

Operation: Referring to the diagrammatical view Fig. 10, the stars 22' indicate the planted hills of corn, the circles 23 indicate the marks or depressions made in the fields by the marking balls 8, and the lines 24 indicate the individual horse guides left by the horse guide markers 12. When the planter is traversing the field, the depressions 23 by the marker will be in exact transverse alinement with the hills planted, as indicated by the broken line 25. As a convenience to the operator, it is especially recommended that a drop indicator be employed in connection with my marker, such as set forth in the application, hereintofore referred to. However, very accurate results may be obtained by the use of this marker alone.

Referring to Fig. 10, of the drawings, a planter with my improved marker is shown, in dotted lines, in position for making a trip, the direction of travel being indicated by the arrow (a); and is shown, in solid lines, in position for making a return or present trip in which the horses follow the marks 24 made by the individual horse guide marked upon the previous trip, and the spacer being shifted to the left side of the machine, thus making a new set of depressions 26, and horse guide marks 27 for the successive trip.

Having thus described my invention, what I claim and desire to secure by Letters Patent of the United States, is the following:

1. In a land marker, the combination of a driving shaft; a marking wheel secured upon said driving shaft; and equi-spaced marking balls loosely journaled upon its periphery, substantially as set forth.

2. In a land marker, the combination with a traction wheel of an implement, of a driving shaft adapted to extend in axial alinement from said traction wheel; a marking wheel secured upon said driving shaft; marking balls journaled upon the periphery of said marking wheel; and means for attaching said driving shaft to said traction wheel through a universal joint, substantially as set forth.

3. In a land marker, the combination of a driving shaft; a marking wheel secured upon said driving shaft, said marking wheel being provided with marking balls; and a pair of double end trailing shoes pivotally secured upon said driving shaft and equally spaced upon each side of said marking wheel, substantially as set forth.

4. In a land marker, the combination of a driving shaft; a marking wheel secured thereon; and a pair of trailing markers pivotally hung from said driving shaft, said trailing markers being adapted to form a pair of individual horse guide furrows, substantially as set forth.

5. In a land marker, the combination of a driving shaft; a marking wheel secured thereon; equally spaced marking balls loosely mounted upon the periphery of said marking wheel; and an equi-angular gudgeon universally jointed to said driving shaft, the number of sides of said gudgeon corresponding with the number of marking balls carried by said marking wheel, substantially as set forth.

6. In a land marker, the combination with an implement having a traction wheel provided with an equi-angular socket, of a driving shaft; a marking wheel secured thereon; an equi-angular gudgeon adapted to loosely fit within said socket; a universal joint connecting said gudgeon with said driving shaft; and a detachable guyrod extending from the intermediate portion of said driving shaft to the forward portion of said implement, substantially as set forth.

In testimony whereof I have signed my name to this specification in the presence of two subscribing witnesses.

HORACE N. RANDALL.

Witnesses:
P. H. THOMPSON,
CATHERINE H. REHFUSS.